3,585,152
CATALYST FOR PREPARING UNSATURATED ACIDS AND ALDEHYDES

Jamal S. Eden, Akron, Ohio, assignor to The B. F. Goodrich Company, New York, N.Y.
No Drawing. Original application Feb. 28, 1967, Ser. No. 619,190, now Patent No. 3,520,923, dated July 21, 1970. Divided and this application Aug. 29, 1969, Ser. No. 870,778
Int. Cl. B01j *11/82*
U.S. Cl. 252—437          2 Claims

ABSTRACT OF THE DISCLOSURE

A catalyst containing molybdenum oxide, tellurium oxide and thorium phosphate is disclosed for the simultaneous preparation of unsaturated aldehydes and unsaturated acids by reacting a monoolefin with oxygen.

---

This is a division of application Ser. No. 619,190 filed Feb. 28, 1967, and now Pat. No. 3,520,923.

BACKGROUND OF THE INVENTION

Many of the catalysts and procedures for oxidizing monoolefinic gaseous hydrocarbons to monoolefinically unsaturated aldehydes or monoolefinically unsaturated carboxylic acids with the same number of carbon atoms as the hydrocarbon have certain deficiencies. The catalysts either have a short active life; they convert only a portion of the hydrocarbon to desired end groups per pass; they oxidize the hydrocarbon excessively to form high proportions of carbon monoxide or carbon dioxide or both; they are not sufficiently selective, so that the hydrocarbon molecule is attacked at both the olefinic unsaturation and at a methyl group; or the oxidation of the olefin either does not proceed beyond the aldehyde stage or goes all the way to the acid.

SUMMARY OF THE INVENTION

This invention relates to catalysts comprising a mixture of a molybdenum, tellurium, oxygen, thorium and phosphorous in a molar ratio, calculated as, 100 $MoO_3$, 10–100 $TeO_2$, and 10–100 of a thorium phosphate, and to a method of preparing acrolein and acrylic acid, or methacrolein and methacrylic acid by passing vapors of propylene or isobutylene and an oxygen containing gas over the catalyst at a temperature of from about 300° C. to about 550° C. The catalyst can also be designated as $Mo_{10}Te_{1-10}Th_{2-20}P_{2-20}O_{39-120}$ with the P being in the form of a phosphate, i.e., each P is attached to 3 or 4 oxygen atoms and the ratio of Th to P is from 1:2 to 3:4.

The catalysts of this invention have long life and will convert a substantial amount, more than 50% per pass, of a gaseous monoolefin such as propylene or isobutylene to yield high proportions of both acrolein and acrylic acid, or methacrolein and methacrylic acid. The catalyst also produces a wide ratio of olefinic aldehyde to monoolefinically unsaturated carboxylic acid by controlling reaction conditions or catalyst composition. Mol percent efficiencies as high as about 40 for the aldehyde and about 50 for the unsaturated carboxylic acid have been obtained with the catalyst and process of this invention. Usually when the efficiency for conversion of the hydrocarbon to aldehyde is high the efficiency for the conversion to acid is lower and vice versa. This provides a degree of flexibility in the process, so as to provide means for obtaining a product mix that is needed at any particular time during commercial operation.

DETAILED DESCRIPTION

The reactants

The essential reactants are (1) propylene or isobutylene and (2) an oxygen-containing gas, which can be pure oxygen, oxygen diluted with an inert gas, oxygen enriched air or air without additional oxygen. For reasons of economy, air is the preferred oxygen-containing reactant.

For the purpose of this invention the hydrocarbons which are oxidized can be defined generically by the formula

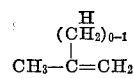

The end products formed result from the oxidation of only one methyl group on the hydrocarbon molecule while the teerminal $CH_2{=}C{<}$ remains intact.

Stoichiometric ratios of oxygen to olefin for the purpose of this invention are 1.5 to 4 to 1. Slightly lower amounts of oxygen can be used at a sacrifice of yield. It is preferred to use 33 to 66% excess oxygen. Larger excesses do not impair the yields of aldehydes and acids, but for practical considerations an excess much above 100% would require extremely large equipment for a given production capacity, particularly if air is used.

The addition of steam into the reactor along with the hydrocarbon and oxygen-containing gas is desirable but not absolutely essential. The function of steam is not clear, but it seems to reduce the amount of carbon monoxide and dioxide in the effluent gases. Other diluent gases can be used. Saturated hydrocarbons such as propane are rather inert under the reaction conditions. Nitrogen, argon, krypton or other known inert gases can be used as diluents if desired but are not preferred because of the added cost.

The catalyst and its preparation

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

A general procedure for preparing a catalyst from water soluble ingredients is to (1) dissolve the requisite amount of a molybdenum salt, a tellurium salt and a thorium salt in water (2) add the requisite amount of phosphoric acid to the thorium salt solution, (3) add the tellurium salt solution to the molybdenum salt solution, and (4) then add the thorium salt-phosphoric acid mixture to the molybdenum-tellurium salt mixture. The catalyst is then dried and baked at 400° C. for about 16 hours.

Supported catalysts can be prepared by adding a dry support or an aqueous slurry thereof to the aqueous solution of catalyst or the aqueous catalyst ingredients can be added to the slurry of the support. Alternatively a slurry of the catalyst ingredients can be prepared in water, then dried an baked. For supported catalysts the aqueous slurry of the catalyst ingredients can be added to an aqueous supsension of the support or vice versa, and then dried and baked. Another method is to blend the dry ingredients of the desired particle size and then mix them thoroughly. Thorough blending and uniform particle size is desired.

A specific example (A) of the solution method is as follows.

(1) Dissolve 158.94 g. of $(NH_4)_6Mo_7O_{24} \cdot 4H_2O$ in 450 ml. of water.

(2) Dissolve 47.88 g. of $TeO_2$ in 100 ml. conc. HCl and add to (1).

(3) Dissolve 165.67 g. of $Th(NO_3)_4 \cdot 4H_2O$ in water and add 69.2 g. of 85% $H_3PO_4$. Add this mixture slowly to the mixture of (1) and (2).

Dry on a steam bath and calcine in a hot tube oven for 16 hours at 400° C. Thereafter, the catalyst is ground to the desired mesh size and sieved.

An example (B) of preparations of a supported catalyst is:

(1) Dissolve 79.47 g. of $(NH_4)_6Mo_7O_{24} \cdot 4H_2O$ in 300 ml. of water and add to 90 grams of catalyst silica in 200 ml. of water. (Microspheroidal silica Ludox H.S.)

(2) Dissolve 23.94 g. of $TeO_2$ in 50 ml. of concentrated HCl and mix with (1).

(3) Dissolve 82.83 g. of $Th(NO_3)_4 \cdot 4H_2O$ in 200 ml. of water and add 34.6 g. of 85% $H_3PO_4$. This mixture was added slowly to the mixture of (1) and (2). Dry on a steam bath and bake in a hot tube at 400° C. for 16 hours. Thereafter, the catalyst is ground to the desired mesh size for fixed or fluid bed reactions and sieved.

Among the suitable supports are silica, silica containing materials, such as diatomaceous earth, kieselguhr, silicon carbide, clay, aluminum oxides and even carbon, although the latter tends to be consumed during the reaction.

Such catalysts, with molar ratios of 100 Mo, 10–100 Te and 10–100 of a thorium phosphate can be used for oxidizing the monoolefinic hydrocarbon to aldehyde and/or carboxylic acid. The catalyst contains chemically bound oxygen so that the generic formula can be written as $MoO_{3_{100}}TeO_{2_{10-100}}ThP_2O_7$ or other thorium phosphate$_{10-100}$. The phosphate can be a $PO_4$ radical, a pyrophosphate, or a polyphosphate.

Reaction conditions

The reaction can be carried out in either a fixed or fluidized catalyst bed.

The reaction temperature can range from about 300° C. to 550° C. For the oxidation of propylene, the preferred range is from about 350° C. to about 450° C. Below 350° C. the conversion per pass is lower and low temperature tends to produce more aldehyde. Usually, a longer contact time is needed at lower temperatures to obtain the yields of desired products obtainable at higher temperatures. Above 450° C. in the propylene oxidation, some of the desired end products appear to be oxidized to carbon oxides. For isobutylene, oxidation temperatures of 375–550° C. are desirable with the preferred range being 380–475° C.

The molar ratio of oxygen to propylene or isobutylene should be at least 2 to 1 for good conversion and yields. Sme excess oxygen, 33 to 66 mol percent is even more desirable and is preferred. There is no critical upper limit as to the amount of oxygen, but when air is used as the oxygen-containing gas it becomes apparent that too great an excess will require large reactors, pumps, compressors and other auxiliary equipment for any given amount of desired end product. It is therefore best to limit the amount of air to provide a 33 to 66% excess of oxygen. This range provides the largest proportion of acid, under given reaction conditions. Also, since care is needed to avoid an explosive mixture, the limiting of air aids in that direction.

The mol ratio of steam to propylene or isobutylene can range from 0 to about 5 to 7, but best results are obtained with molar ratios of about 3 to 5 per mol of olefin and for this reason are preferred.

The contact time can vary considerably in the range of about 2 to 70 seconds calculated at 25° C. and 760 mm. Best results are obtained in a range of about 8 to 54 seconds and this range is preferred. Longer contact times usually favor the production of acid at any given temperature.

The particle size of catalyst for fixed bed operations used is from 10–18 mesh, passes 10 mesh, held on 18 (U.S.). As is known, for fixed beds, the size may be a wide range of particle sizes. For fluid bed systems, a useful catalyst size is to pass 80 and be held on 325 mesh (U.S.).

The reaction can be run at atmospheric pressure, in a partial vacuum or under induced pressure up to 50–100 p.s.i. Atmospheric pressure is preferred for fixed bed systems and a pressure of 1 to 100 p.s.i. for fluid bed reactions. Operation at a pressure which is below the dew point of the unsaturated acid at the reaction temperature is advantageous.

The data in the examples show that wide variations in percentages of unsaturated acids and aldehydes can be obtained with a single catalyst, using fixed ratio of reactants but changing the temperature and/or contact time. Further variation is obtainable by controlling the other variables in the reaction including the catalyst compositions within the limits set forth herein.

EXAMPLES 1–5

A series of runs were made in a fixed bed reactor of a high silica (Vycor) glass tube 12 inches long and 30 mm. outer diameter. The reactor had three inlets, one for air, one for steam and one for propylene. Three external electrically operated heating coils were wound on the reactor. One of the coils extended along the entire length of the reactor and each of the remaining coils extended only about one half the length of the reactor. Outlet vapors were passed through a short water cooled condenser. Uncondensed gases were passed through a gas chromatograph (Perkin-Elmer model 154D) and analyzed continuously. The liquid condensate was weighed and then analyzed for acrylic acid and acrolein in the gas chromatograph. The reactor was filled with 170 ml. of unsupported catalyst made by the solution method (A) described above, using a ratio of 75 $MoO_3$, 25 $TeO_2$ and 25 $ThP_2O_7$. Empirically the catalyst is $Mo_{75}Te_{25}Th_{25}P_{50}O_{450}$ and the P is present as $P_2O_7^{-4}$. The catalyst was not supported and had a mesh size of 10–18 (U.S. Sieve). Steam at a temperature of 200–250° C. was first passed into the reactor. Then propylene and air were separately fed into the stream of water vapor. This mixture then passed through a pre-heater and entered the reactor at about 200–250° C. The reactor was pre-heated to about 285° C. before the gas feed was begun. The ratio of reactants per mol of propylene, contact time (STP), the reaction temperature in ° C., and the data obtained in these runs is summarized in the Table A below.

TABLE A

| Run No. | Oxygen, mols | Steam, mols | Temp., ° C. | Contact time, seconds | Mol percent propylene converted | Mol percent yield on propylene converted | | Mol percent efficiency | |
|---|---|---|---|---|---|---|---|---|---|
| | | | | | | Acr. | AA | Acr. | AA |
| 1 | 3.0 | 4.06 | 345 | 46.0 | 90.28 | 39.89 | 27.13 | 36.1 | 24.49 |
| 2 | 3.0 | 4.06 | 380 | 46.0 | 98.7 | 24.36 | 41.61 | 24.05 | 41.07 |
| 3 | 4.03 | 4.06 | 430 | 36.5 | 98.92 | 14.99 | 53.26 | 14.83 | 52.68 |
| 4 | 3.04 | 4.2 | 365 | 60.0 | 98.69 | 19.54 | 49.25 | 19.28 | 48.60 |
| 5 | 3.0 | 3.88 | 425 | 32.6 | 98.57 | 31.79 | 45.02 | 31.34 | 44.37 |

NOTE.—Acr.=Acrolein; AA=Acrylic acid.

by use of rheostats. The reaction conditions, ratio of reactants and results are set forth in Table B.

TABLE B

| Run No. | Oxygen, mols/ mol $C_3H_6$ | Steam, mols/ mol $C_3H_6$ | Contact time, seconds | Temp., °C. | Mol percent propylene converted | Mol percent yield on propylene converted | | Mol percent efficiency | |
|---|---|---|---|---|---|---|---|---|---|
| | | | | | | Acr. | AA | Acr. | AA |
| 1 | 3.0 | 3.88 | 16 | 355 | 74.68 | 61.11 | 14.99 | 45.64 | 11.17 |
| 2 | 3.0 | 3.88 | 16 | 365 | 89.19 | 58.47 | 17.14 | 52.15 | 15.29 |
| 3 | 3.0 | 3.88 | 16 | 390 | 91.96 | 54.15 | 24.87 | 49.79 | 22.89 |
| 4 | 3.0 | 3.88 | 16 | 415 | 98.30 | 28.28 | 46.20 | 26.82 | 45.41 |

NOTE.—Acr.=Acrolein; AA=Acrylic acid.

EXAMPLES 6-9

A supported catalyst prepared according to procedure (B) above was prepared to the ratio 75 $MoO_3$–25 $TeO_2$–25 $ThP_2O_7$–250 $SiO_2$. The particle size was between 80 and 325 mesh (U.S. Sieve). The runs were made in a fluidized bed. In these runs the reactor was a high silica glass cylinder with an O.D. of 38 mm. and height of 12 inches. It was filled to a height about 4 inches (85 ml.). In all cases the catalyst was fluidized by first injecting hot air into the reactor and then adding the requisite amounts of steam and propylene. The gases were preheated to about 250° C. prior to entering the reactor. The reactor was heated externally with electrical resistance wire, and the reaction temperature was controlled

I claim:
1. A catalyst consisting essentially of, on a molar basis, molybdenum oxide, 100; tellurium oxide 10–100; and thorium phosphate 10–100.
2. The catalyst of claim 1 wherein the catalyst consists essentially of 100 $MoO_3$, 10–100 $TeO_2$ and 10–100 $ThP_2O_7$.

References Cited

UNITED STATES PATENTS 3,445,500  5/1969  Eden  252—437X
3,509,069  4/1970  Eden  252—437

PATRICK P. GARUIN, Primary Examiner

U.S. Cl. X.R.
260—533N, 604